United States Patent [19]

Wylie et al.

[11] Patent Number: 5,096,156
[45] Date of Patent: Mar. 17, 1992

[54] MOTORIZED DAMPER APPARATUS

[75] Inventors: Calvin R. Wylie, Fair Oaks; Michael A. Kuhlmann, Sacramento; Patrick H. Crites, Orangevale, all of Calif.

[73] Assignee: Beutler Heating & Air Conditioning, Inc., Sacramento, Calif.

[21] Appl. No.: 688,833

[22] Filed: Apr. 22, 1991

[51] Int. Cl.[5] ............................................ F16K 31/04
[52] U.S. Cl. .................................. 251/77; 251/129.11; 251/305
[58] Field of Search ................ 251/129.11, 80, 83, 251/81, 79, 305, 77

[56] References Cited

U.S. PATENT DOCUMENTS

| | | | |
|---|---|---|---|
| 2,815,924 | 12/1957 | Burch | 251/305 |
| 4,246,918 | 1/1981 | Dean | 251/305 X |
| 4,850,319 | 7/1989 | Imoehl | 251/129.11 X |
| 4,917,350 | 4/1990 | Beyer et al. | 251/129.11 |
| 4,981,283 | 1/1991 | Bradshaw et al. | 251/129.11 |

Primary Examiner—Arnold Rosenthal
Attorney, Agent, or Firm—Thomas R. Lampe

[57] ABSTRACT

Motorized damper apparatus including a conduit, a damper blade movably mounted within the conduit between an open position and a closed position, and mechanism including a motor for moving the damper blade between the open and closed positions. The damper blade is decoupled from the motor after movement of the damper blade from the closed position to the open position.

13 Claims, 3 Drawing Sheets

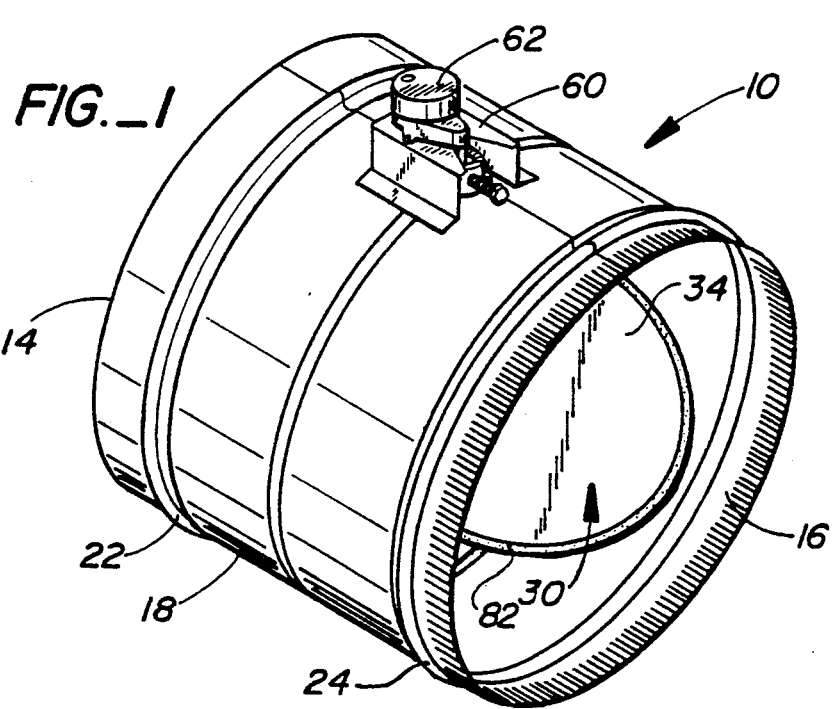
FIG._1
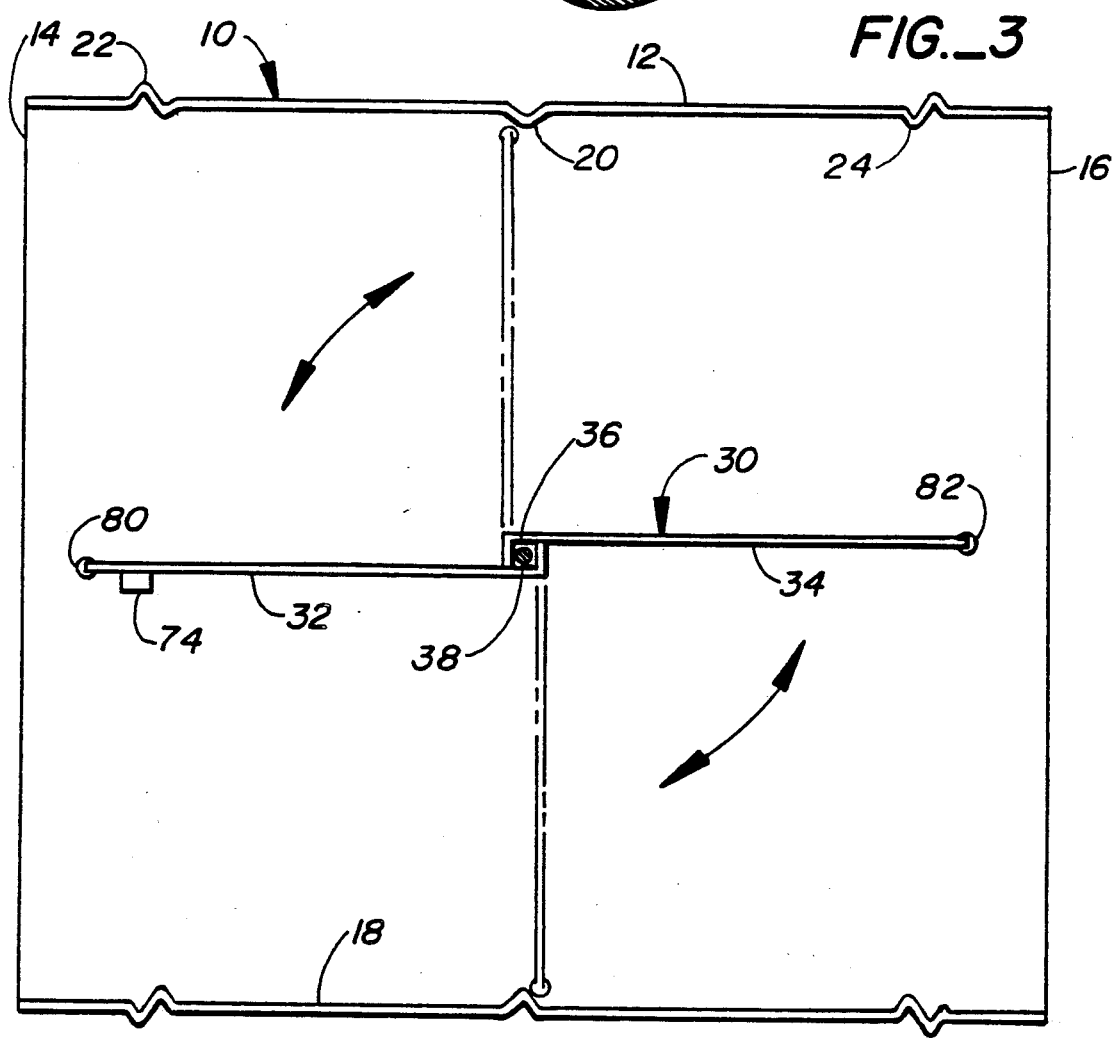
FIG._3

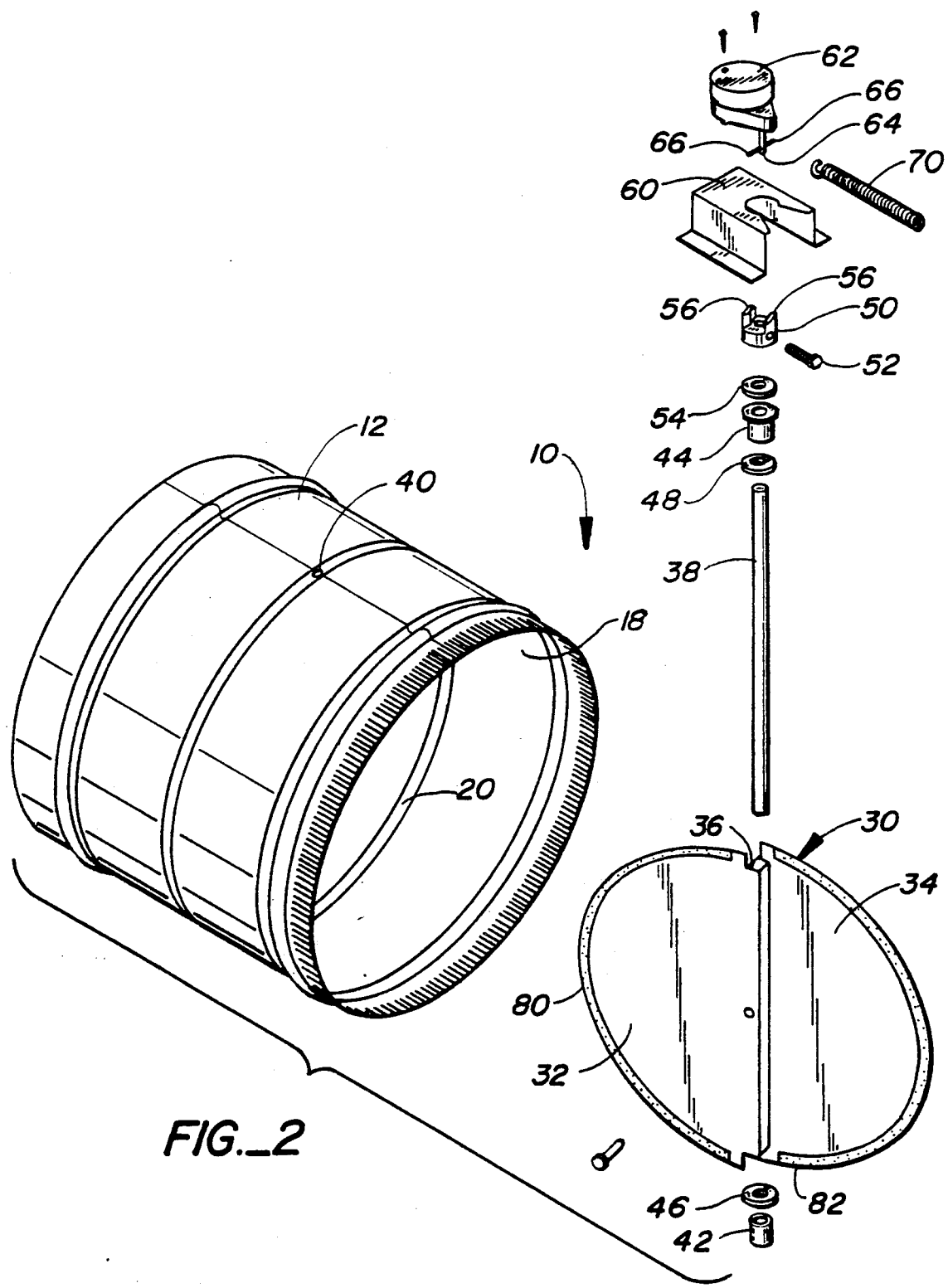
FIG._2

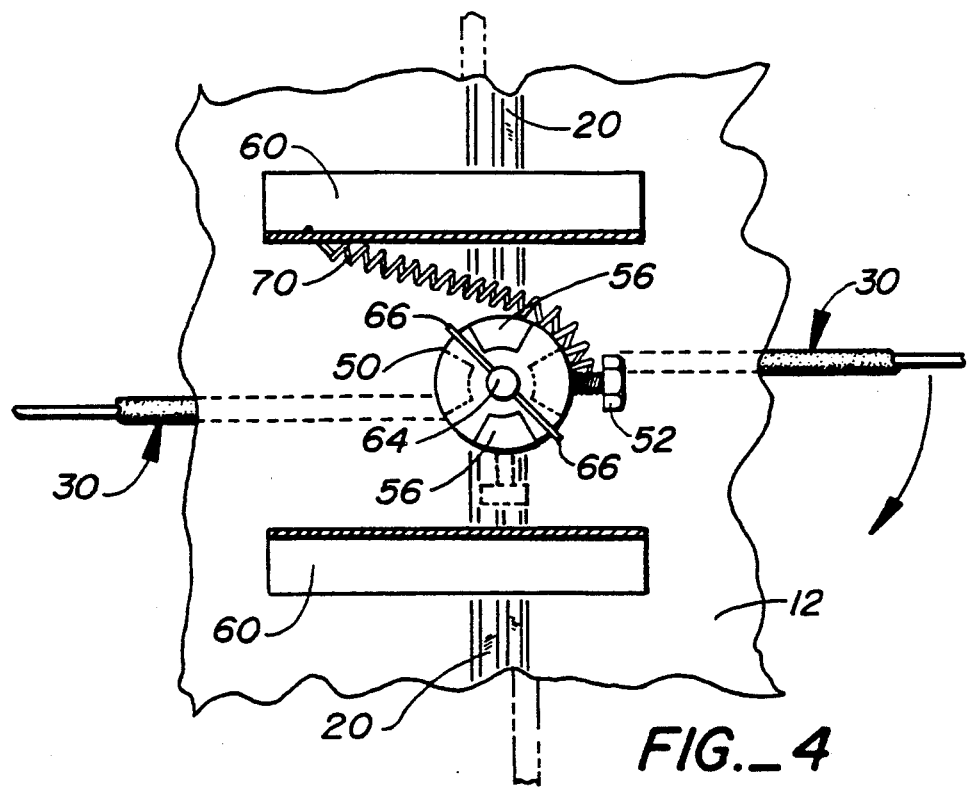
FIG._4
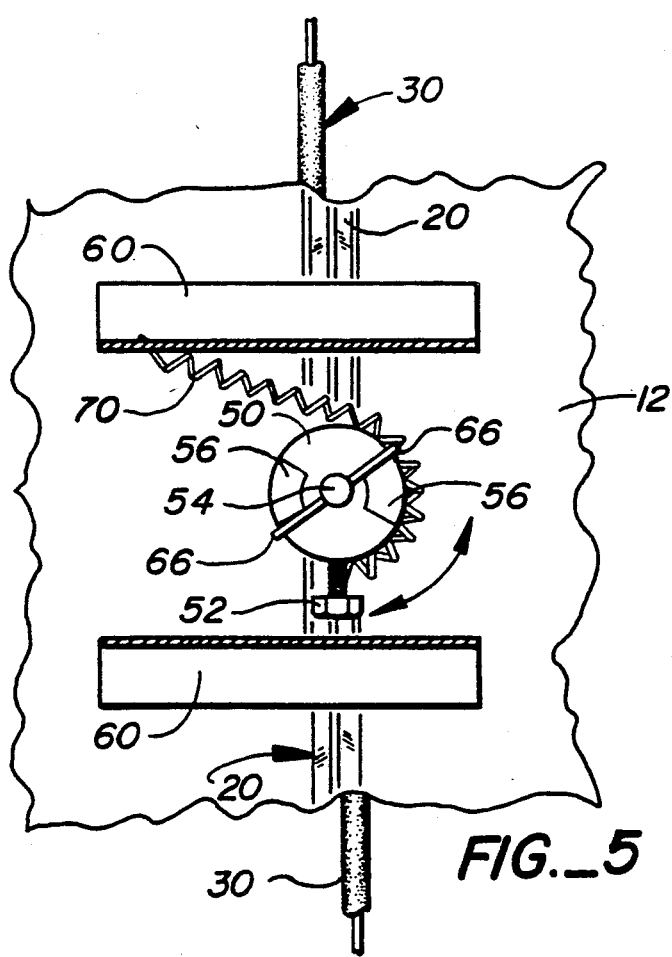
FIG._5

MOTORIZED DAMPER APPARATUS

TECHNICAL FIELD

This invention relates to a damper apparatus to be incorporated in a heating, cooling or ventilation system. More particularly, the apparatus includes a damper blade which is operatively associated with a motor in a specified manner to impart movement to the damper plate.

BACKGROUND ART

Motor driven damper blades per se are known in the prior art. Conventional systems of this type, however, have a number of deficiencies.

Prior art arrangements commonly employ a direct interconnection between the output shaft of the motor and the damper blade. Energization of the motor causes rotation of the output shaft and corresponding movement of the damper blade to a desired position (usually a closed position) relative to the conduit means with which the damper blade is operatively associated. Typically, the motor remains energized to hold the damper blade against one or more stops within the conduit which properly position the damper blade relative thereto. When the motor is de-energized, the prior art approaches often employ a spring in operative association with the damper blade to return the damper blade to its "normal" (usually open) position relative to the conduit. Again, a stop arrangement of suitable character is conventionally incorporated in the conduit to be engaged by the damper blade to maintain the damper blade in its normal position until the motor is once again energized.

Employment of the aforedescribed spring return feature when there is a direct or positive interconnection between the motor and the damper blade causes difficulties. The spring return tends to overstress the motor when the blade hits the stop at normal position. It has been found that the motor will "bounce" back and forth due to the inertia developed in the motor by the spring return. While the motor and damper blade eventually come to rest, the "bounce" action, especially over a period of time and frequent occurrence, causes considerable and undue wear of the motor's transmission gears, drastically shortening the life of the motor.

Another problem arises even before prior art dampers of the foregoing type are installed and operational. Persons installing such systems often test their operation by manually moving the damper blade. Of course, when there is a direct or positive connection between the damper blade and its associated motor, the transmission gears of the motor will also be forced to move to accommodate such manual movement of the damper. This can, and often does, result in breakage of the gears or other motor components.

In addition to the foregoing deficiencies, many prior art motorized damper constructions lack structural integrity and strength. For example, many such devices, particularly the conduit components thereof, can be relatively easily bent or warped during shipping, handling and installation. This can prevent proper operation of the damper by virtue of the conduit wall being contacted by the movable damper blade during movement between its operating positions.

DISCLOSURE OF INVENTION

The damper apparatus of the present invention is characterized by the fact that it does not suffer from the deficiencies noted above found in conventional motorized damper constructions. In the present arrangement there is no undue stress on the motor caused by utilization of a damper blade spring return nor as a result of manual manipulation of the damper blade. Furthermore, the damper apparatus disclosed herein is strong and stable and not prone to flexure or warpage during handling, installation, or use.

The damper apparatus of the present invention includes conduit means defining spaced openings and an interior between the spaced openings.

A damper blade is movably mounted relative to the conduit means within the interior and movable between a first position wherein fluid-flow communication between the spaced openings is substantially unblocked by the damper blade and a second position wherein fluid-flow communication between the spaced openings is substantially blocked by the damper blade.

Means is provided for moving the damper blade between the first and second positions. More specifically, such means includes a motor and transmission means operatively interconnecting the damper blade and the motor. The transmission means includes decoupler means for decoupling the damper blade from the motor after movement of the damper blade to one of the positions. The output shaft of the motor and the damper blade are capable of limited independent movement.

The decoupler means includes a first coupler element connected to the output shaft and a second coupler element connected to the damper blade. The first and second coupler elements are in engagement when the damper blade is in the second position and out of engagement when the damper blade is in the first position.

The damper blade moving means additionally includes biasing means for biasing the damper blade toward the first position, the biasing means being responsive to de-energization of the motor to move the damper blade to the first position. The biasing means is effective upon de-energization of the motor to rotate the output shaft when the damper blade moves from the second position to the first position, the inertia of the motor operable to disengage the first and second coupler elements after the damper blade reaches the first position.

Other features, advantages, and objects of the present invention will become apparent with reference to the following description and accompanying drawings.

BRIEF DESCRIPTION OF DRAWINGS

FIG. 1 is a perspective view of damper apparatus constructed in accordance with the teachings of the present invention;

FIG. 2 is an exploded view of the apparatus shown in FIG. 1;

FIG. 3 is an enlarged, somewhat diagrammatic, side view illustrating the cooperative relationship existing between the damper blade of the apparatus and the conduit portion thereof;

FIG. 4 is an enlarged, fragmentary, plan view illustrating the relative positions assumed by selected components of the apparatus during one stage of the operation thereof; and FIG. 5 is a view similar to FIG. 4 but illustrating the relative positions assumed by the components during another phase of the operation of the apparatus.

BEST MODE FOR CARRYING OUT THE INVENTION

Referring now to the drawings, damper apparatus constructed in accordance with the teachings of the present invention is generally designated by reference numeral 10. Apparatus 10 includes a conduit 12 defining spaced openings 14, 16 and an interior between the spaced openings. The conduit has a circular-shaped outer wall 18. The wall is grooved to provide an inwardly projecting, circumferential bead or protrusion 20. The conduit wall, which is preferably formed of sheet metal, also includes beads 22, 24 adjacent openings 14, 16. Beads 22, 24 are each formed by adjacent and opposed grooves formed in the wall and provide strength and rigidity to the conduit adjacent to the openings.

A damper blade 30, which may also be formed of sheet metal or the like, is movably mounted relative to the conduit within the interior and movable between a first position (the solid line position shown in FIG. 3), wherein fluid-flow communication between the spaced openings is substantially unblocked by the damper blade, and a second position (the position shown in phantom in FIG. 3), wherein fluid-flow communication between the spaced openings is substantially blocked by the damper blade.

Damper blade 30 includes a pair of plates 32, 34 which are engageable with opposed sides of the bead or protrusion 20 when the damper blade is in its second position. In the arrangement illustrated, the damper blade 30 has a generally circular-shaped outer periphery and plates 32, 34 each have a substantially semi-circular configuration.

The plates are disposed along parallel planes. The innermost ends of the plates are bent as shown and joined together by any suitable expedient, such as mechanical fasteners or the like. The plates define a throughbore 36 at the center of the damper blade.

A double-ended support shaft 38 extends through throughbore 36. The opposed ends of support shaft 38 are positioned in opposed apertures 40 (one of which is shown in FIG. 2) extending through wall 18 at the location of bead 20. The support shaft 38 may be held in position for rotatable movement relative to the conduit by any suitable means. For example, the shaft ends may be disposed in bushings 42, 44 to provide rotatable support for the shaft relative to the conduit. Washers 46, 48 may be employed between the bushings and the damper blade.

A coupler element 50 is secured to one end of support shaft 38 by a threaded fastener 52. A flat washer 54 is disposed about the support shaft between coupler element 50 and the shoulder washer of bushing 44. Coupler element 50 includes two spaced projections or lugs 56 which define notches therebetween.

Coupler element 50 extends beyond the wall 18 of the conduit and is housed within a bracket 60 secured to the conduit wall 18 by any suitable expedient. An electric motor 62 having a gearbox and an output shaft 64 extending from the gearbox is fastened to the bracket 60 by suitable fasteners such as machine screws. An electric motor which may be suitably utilized when carrying out the teachings of the present invention is the Synchron motor made available by Hansen Manufacturing, Inc., P. O. Box 23, Princeton, IN 47670.

A coupler element in the form of pin-like projection 66 extends from opposed sides of output shaft 64. Projections 66 are in registry with projections 56 and, as will be seen in greater detail below, are selectively engageable therewith during operation of the damper apparatus.

As may perhaps best be seen with reference to FIGS. 4 and 5, a coil tension spring 70 is attached at one end thereof to threaded fastener 52. The other end of the spring is attached to bracket 60. The spring 70 is always under tension and continually biases the damper blade 30 to its open or first position wherein the blade is disposed in the center of the conduit interior with the plates 32, 34 thereof in alignment with the longitudinal axis of the conduit and directed toward the openings 14, 16. This position is illustrated by the solid line presentations of damper blade 30 shown in FIGS. 3 and 4. A stop of any suitable nature is employed to prevent further movement of the damper blade under the urging of the coil tension spring 70. For example, FIG. 3 shows a stop in the form of a protrusion 74 projecting from wall 18.

From its first position just described the damper blade 30 is movable to a second or closed position wherein fluid-flow communication between the spaced openings is substantially blocked by the damper blade. This second position is illustrated by the phantom line depiction in FIG. 3 and also by the solid line depiction of the damper blade 30 in FIG. 5. When the damper blade 30 is in the second position the plates 32, 34 are engageable with opposed sides of the bead or protrusion 20. Preferably, resilient seal elements formed of a suitable resilient material such as rubber are disposed about the outer peripheral surfaces of the plates and the seal elements (designated by reference numerals 80, 82 in the drawings) substantially simultaneously engage the bead when the damper blade is in the second position.

As previously stated, the spring 70 continually urges the damper blade 30 to its first position. This is accomplished by virtue of the fact that coupler element 50 is affixed to shaft 38 and the shaft is in turn affixed to the damper blade. The damper blade is in the first position when the motor 62 is not energized.

When the motor 62 is energized, pins or projections 66 on the output shaft 64 will rotate and engage the projections or lugs 56 on coupler element 50. This will serve to rotate the support shaft 38 and the damper blade until the damper blade engages bead 20. The damper blade will stay in its second position until the motor is once again de-energized.

De-energization of the motor allows spring 70 to rotate the damper blade and return it to its first position and engage stop 74. During movement of the damper blade from the second to the first position, coupler element 50 drives the output shaft 64 in the same rotational direction due to engagement between projections 56, 66, such projections, of course, also having been in engagement during the entire period of movement of the damper blade from the first to the second position.

It will be appreciated that rotation of the projections or pins 66 and output shaft 64 results in inertial forces built up in the motor. Such inertia causes the projections 66 to disengage from projections 56 after the damper blade has reached its first position. Output shaft 64 will continue rotational movement until the inertial energy is expended. Pins or projections 66 have considerable latitude for movement within the notches defined by the lugs or projections 56 of the coupler element 50. This means that the motor, including its gear mechanism, will not be subjected to severe stress as is the case with prior art arrangements. It will also be appreciated that this loose connection allows the damper blade 30 to be manually manipulated without unduly stressing the motor. The damper blade and the output shaft of the motor are then, in accordance with the teachings of the present invention, capable of limited independent movement which will relieve the strains inherent in prior art approaches.

It is apparent from the above description that the protrusion or bead 20 forms the dual function of operating as a seat engageable by the damper blade and as a structural component which will add to the strength and overall structural integrity of the apparatus. The bracket is, as shown, positioned with the support legs thereof disposed at right angles to bead 20 and the motor is oriented with the output shaft thereof disposed along the center line of the conduit Such an arrangement has been found to provide a high degree of stability for the motor and its related components.

We claim:

1. Damper apparatus comprising, in combination: conduit means defining spaced openings and an interior between said spaced openings; a damper blade movably mounted relative to said conduit means within said interior and movable between a first position wherein fluid flow communication between said spaced openings is substantially unblocked by said damper blade and a second position wherein fluid flow communication between said spaced openings is substantially blocked by said damper blade; and damper blade moving means for moving said damper blade between said first and second positions, said damper blade moving means including a motor and transmission means operatively interconnecting said damper blade and said motor, said transmission means including decoupler means for decoupling said damper blade from said motor after movement of said damper blade to one of said positions.

2. The damper apparatus according to claim 1 wherein said motor has an output shaft, said decoupler means including a first coupler element connected to said output shaft and a second coupler element connected to said damper blade, said first and second coupler elements being in engagement when said damper blade is in said second position and out of engagement when said damper blade is in said first position.

3. The damper apparatus according to claim 2 wherein said damper blade moving means additionally includes biasing means for biasing said damper blade toward said first position, said biasing means being responsive to de-energization of said motor to move said damper blade to said first position.

4. The damper apparatus according to claim 3 wherein said biasing means comprises a spring operatively interconnecting said conduit means and said damper blade.

5. The damper apparatus according to claim 2 additionally comprising a double-ended damper blade support shaft connected to and supporting said damper blade and rotatably mounted at the ends thereof on said conduit means, said second coupler element being affixed to one of said ends.

6. The damper apparatus according to claim 5 wherein said first coupler element comprises at least one projection projecting from said output shaft and said second coupler element comprises at least one projection projecting from said damper blade shaft.

7. The damper apparatus according to claim 3 wherein said biasing means is effective upon de-energization of said motor to rotate said output shaft when said damper blade moves from said second position to said first position, the inertia of said motor operable to disengage said first and second coupler elements after said damper blade reaches said first position.

8. The damper apparatus according to claim 5 wherein said conduit means has an outer wall having an inwardly projecting, circumferential bead located between said spaced openings, said conduit means outer wall defining spaced, opposed apertures at said bead and said blade support shaft ends projecting through said apertures.

9. The damper apparatus according to claim 8 wherein said damper blade includes a pair of plates engageable with opposed sides of said bead when said damper blade is in said second position.

10. The damper apparatus according to claim 9 wherein resilient seal elements are disposed about outer peripheral surfaces of said plates, said seal elements substantially simultaneously engaging said bead when said damper plate is in said second position.

11. The damper apparatus according to claim 9 wherein said damper blade has a generally circular-shaped outer periphery and wherein said plates each have a substantially semicircular configuration.

12. The damper apparatus according to claim 9 wherein said plates are disposed along parallel planes.

13. The damper apparatus according to claim 2 additionally comprising bracket means affixed to said conduit means for supporting said motor externally of said conduit means with the output shaft of said motor disposed along the center line of said conduit means.

* * * * *